United States Patent [19]
Wilkerson et al.

[11] Patent Number: 5,309,312
[45] Date of Patent: May 3, 1994

[54] OVERCURRENT PROTECTION RELAY WITH COMMUNICATIONS

[75] Inventors: Timothy M. Wilkerson, Highland, Ill.; Sidney B. Harden; Richard A. Freeman, both of St. Louis, Mo.

[73] Assignee: Basler Electric Company, Highland, Ill.

[21] Appl. No.: 586,439

[22] Filed: Sep. 21, 1990

[30] Foreign Application Priority Data

Sep. 29, 1989 [CA] Canada .................................. 614904

[51] Int. Cl.$^5$ .......................................... H02H 7/26
[52] U.S. Cl. ........................................ 361/79; 361/68
[58] Field of Search ................. 361/102, 86–97, 361/79, 78

[56] References Cited

U.S. PATENT DOCUMENTS

| | | | |
|---|---|---|---|
| 4,321,681 | 3/1982 | Sackin et al. ........................ | 361/79 |
| 4,446,498 | 5/1984 | Stich ...................................... | 361/87 |
| 4,631,625 | 12/1986 | Alexander et al. .................... | 361/94 |
| 4,670,812 | 6/1987 | Doerfler et al. ....................... | 361/94 |
| 4,685,024 | 8/1987 | Martellock et al. ................... | 361/93 |
| 4,722,059 | 1/1988 | Engel et al. ........................... | 361/94 |
| 4,751,605 | 6/1988 | Mertz et al. ........................... | 361/91 |
| 4,811,154 | 3/1989 | Trenkler et al. ....................... | 361/93 |
| 4,878,144 | 10/1989 | Nebon .................................... | 361/96 |
| 4,885,656 | 12/1989 | Suzuki et al. .......................... | 361/94 |
| 4,903,163 | 2/1990 | Atwater et al. ........................ | 361/87 |
| 5,038,246 | 8/1991 | Durivage III ......................... | 361/93 |

Primary Examiner—A. D. Pellinen
Assistant Examiner—S. Jackson
Attorney, Agent, or Firm—Senniger, Powers, Leavitt & Roedel

[57] ABSTRACT

An apparatus for protecting an electrical power system supplying electrical power to an electrical load comprises a transformer for sensing an operating condition of the electrical power system and for producing an analog signal representative of the operating condition, and a microcomputer for periodically sampling the analog signal and for converting the analog signal into a series of digital signals. The microcomputer includes circuitry for deriving a digital value representative of a square root of the series of digital signals and circuitry for processing the digital value over time to determine a processed value which is a function of both the sensed operating condition and time. A circuit breaker is responsive to the microcomputer for disconnecting the power system from the load in the event that the processed value is not within preset limits. The microcomputer also generates a relay signal representative of the status of the relay and the relay includes an output port responsive to the relay signal, for communicating the status of the relay to a remote station.

19 Claims, 11 Drawing Sheets

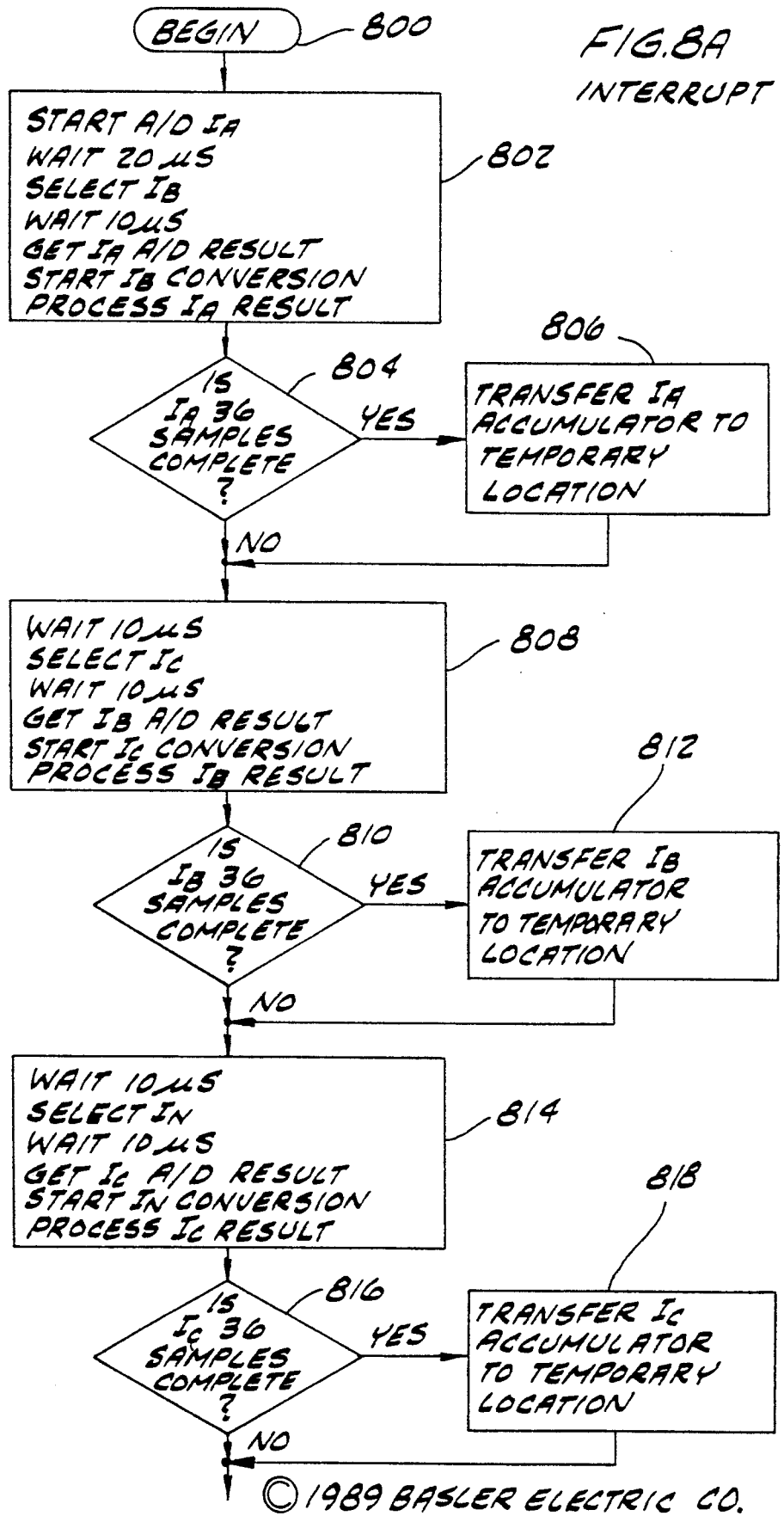

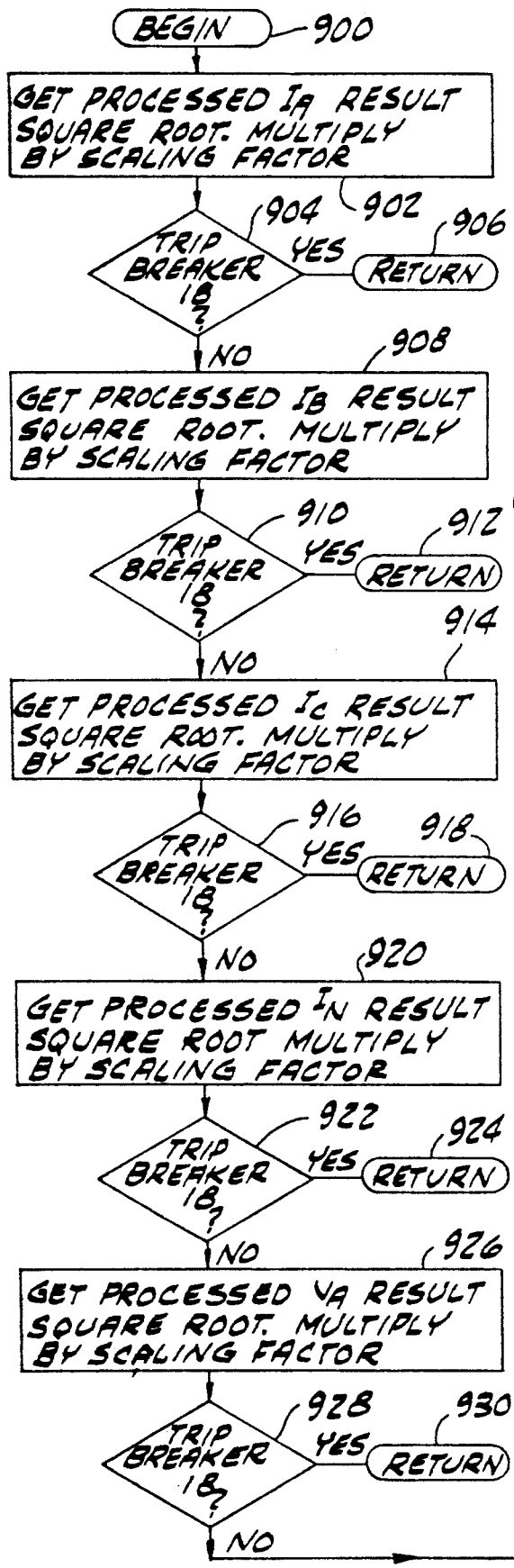
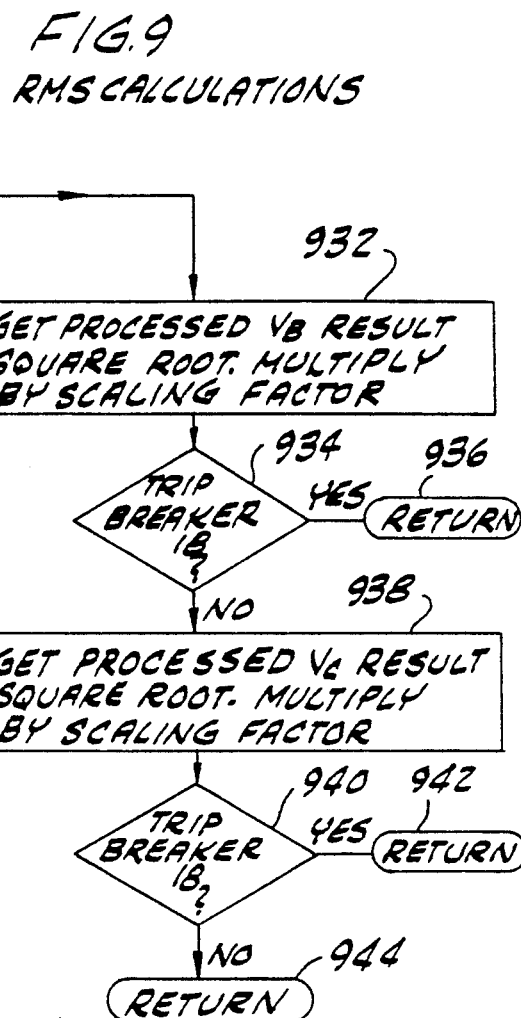
FIG. 9
RMS CALCULATIONS
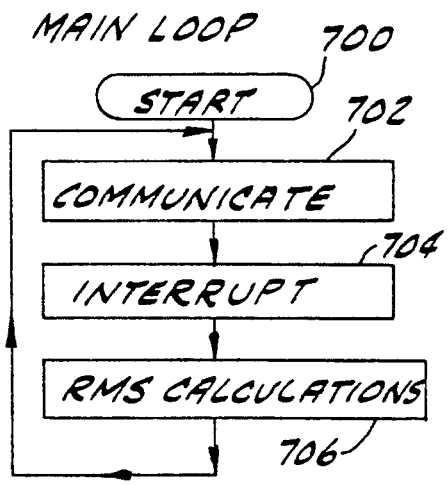
FIG. 7
MAIN LOOP

OVERCURRENT PROTECTION RELAY WITH COMMUNICATIONS

Copyright © 1989 Basler Electric Company. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to overcurrent protection devices and in particular to an overcurrent relay for protecting an electrical power system and for communicating with a master unit such as an energy management computer.

Electrical power systems, such as alternating current (AC) systems, are widely used for transmission and distribution of electrical power to electrical loads. In order to protect distribution circuits, generators, transformers, and other major components of the electrical power system time overcurrent relays are used. The time overcurrent relay senses an overcurrent condition and trips a circuit breaker connected between the electrical power system and the electrical load. The time overcurrent relay monitors current in the electrical power system and compares it against a selected pickup point. When the monitored current is above the selected pickup point timing is initiated in accordance with a selected time-current characteristic curve. If the current drops below the pickup point before timing is completed, then the timing is reset. When the monitored current exceeds the pickup point after timing is completed the circuit breaker is tripped.

In the prior art it has been known to use a microprocessor based time overcurrent relay. The microprocessor stores in memory the selected pickup point and the time-current characteristic curves. The microprocessor converts the monitored current to a digital value and compares the digital value against the selected pickup point. When the digital value exceeds the pickup point for a preselected period of time the circuit breaker is tripped. Although this process is acceptable, it would be advantageous to process the monitored current in a different manner to obtain more accurate results. For example, the monitored current, which is an analog signal, could be periodically sampled and converted into a series of digital signals. A digital value representative of a square root of the series of digital values may be derived. This derived digital value may be processed over time to determine a processed value which is a function of both the monitored current and time. The circuit breaker is tripped in the event that the processed value is not within preset limits. Additionally, it would be desirable to be able to communicate the processed value to a remote station, such as an energy management computer.

SUMMARY OF THE INVENTION

Generally, an apparatus for protecting an electrical power system supplying electrical power to an electrical load comprises means for sensing an operating condition of the electrical power system and for producing an analog signal representative of the operating condition, means for periodically sampling the analog signal and for converting the analog signal into a series of digital signals, means for deriving a digital value representative of a square root of the series of digital signals, means for processing the digital value over time to determine a processed value which is a function of both the sensed operating condition and time, means, responsive to the processing means, for disconnecting the power system from the load in the event that the processed value is not within preset limits, means for generating a relay signal representative of the status of the relay, and means, responsive to the relay signal, for communicating the status of the relay to a remote station.

In another form of the invention an overcurrent relay for use in an electrical power system having a transformer and a load connected through a circuit breaker comprises means for sensing an operating condition of the transformer and for producing an analog signal representative of the operating condition, means for periodically sampling the analog signal and for converting the analog signal into a series of digital signals, means for deriving a digital value representative of a square root of the series of digital signals, means for processing the digital value with respect to time to determine a processed value which is a function of both the sensed operating condition and time, means, responsive to the processing means, for actuating the circuit breaker to disconnect the transformer from the electrical power system in the event that the processed value is not within preset limits, means for generating a relay signal representative of the status of the relay, and means, responsive to the relay signal, for communicating the status of the relay to a remote station.

Other objects and features will be in part apparent and in part pointed out hereinafter.

BRIEF DESCRIPTION OF THE DRAWINGS

FIG. 7, 8A, 8B, 8C and 9 are flowcharts of a main routine in the software of the overcurrent relay.

Corresponding reference characters indicate corresponding parts throughout the several views of the drawings.

DETAILED DESCRIPTION OF THE PREFERRED EMBODIMENT

Figure 1:
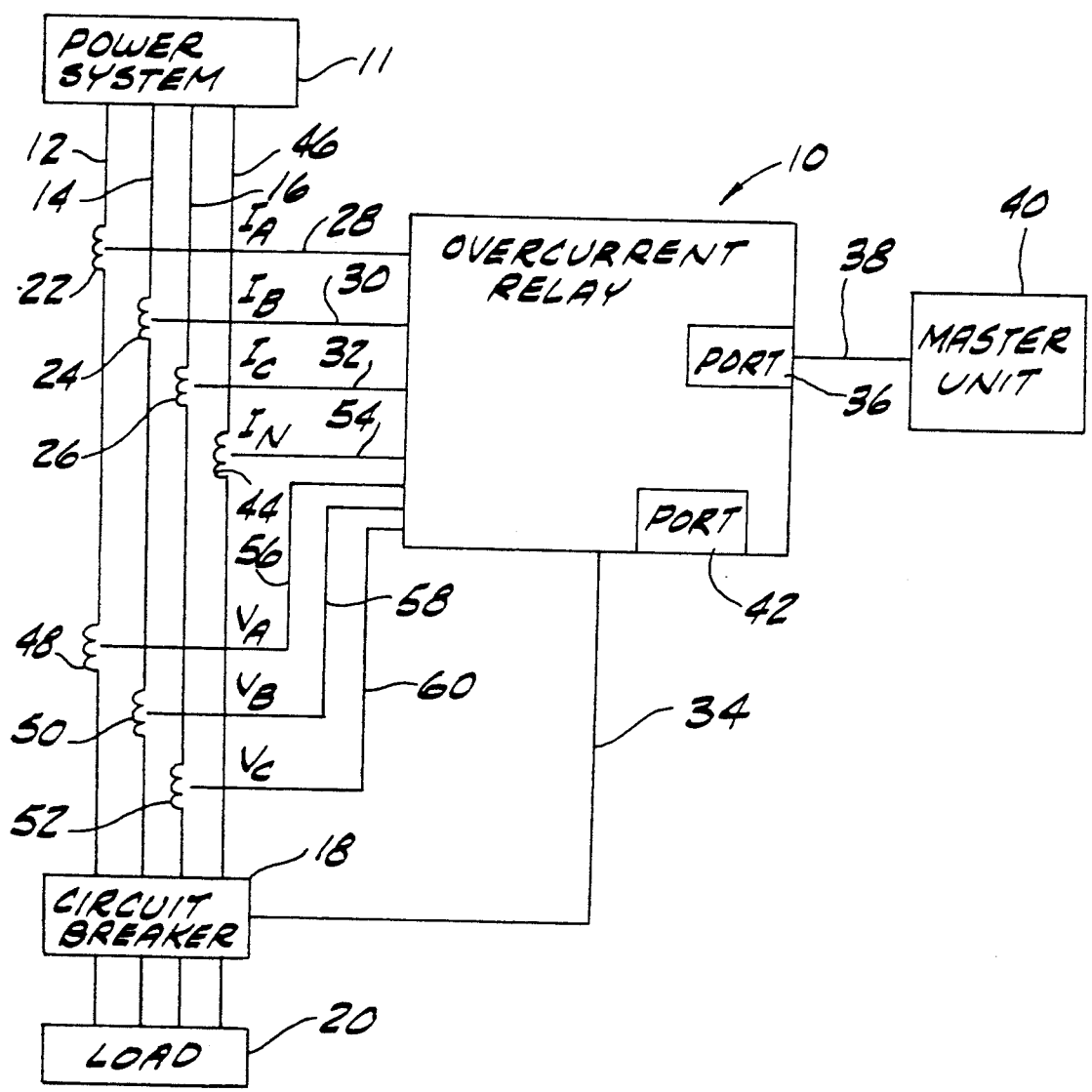
FIG. 1 is a block diagram of an electrical power system protected by the overcurrent relay including inputs for sensing voltages and a neutral line current.

Referring now to the drawings, and more particularly to FIG. 1, there is illustrated a block diagram of an overcurrent relay constructed in accordance with the principles of the present invention indicated generally as 10. Relay 10 monitors the currents in an electrical power system 11 or other circuit to be protected. The power system 11 may be any type such as a single-phase system or a polyphase system. The power system 11 illustrated in FIG. 1 is a three-phase alternating current system represented by lines 12, 14, and 16. Relay 10 monitors or senses the currents in each of the phases of the three-phase system. A circuit breaker 18 is provided for disconnecting the power system 11 from a load 20 upon the occurrence of a fault condition, such as an overcurrent condition.

In order to obtain a plurality of output currents $I_A$, $I_B$, and $I_C$ which are directly proportional to the line currents in lines 12, 14, and 16, current transformers 22, 24, and 26 are magnetically coupled to each line as shown in FIG. 1. The primary windings of transformers 22, 24, and 26 are energized in accordance with the line currents in lines 12, 14, and 16, respectively. The secondary windings of the transformers 22, 24, and 26 are connected to the relay 10 via lines 28, 30, and 32, respectively. Relay 10 is connected to the circuit breaker 18 via line 34. If the current in any of the phases rises above some preset maximum level for a preset maximum length of time, the relay 10 will send a trip signal over line 34 to the circuit breaker 18 opening the breaker and disconnecting the load 20 from the power system 11. Alternatively, the currents in any of the phases may be instantaneously monitored so that, if the current rises above the preset, the trip signal is immediately sent over line 34.

As an added option, relay 10 includes a current transformer 44 for monitoring current $I_N$ in a neutral line 46 of the power system 11. In addition, input transformers 48, 50, and 52 monitor voltages $V_A$, $V_B$, and $V_C$ in each of the phases in the power system. The neutral current transformer 44 is connected to the relay 10 via line 54. The input transformers 48, 50, and 52 are connected to the relay 10 via lines 56, 58, and 60, respectively. The neutral current or the voltage in any of the phases rises above some preset maximum level for a preset length of time, the relay 10 will send a trip signal over line 34 to the circuit breaker 18 opening the breaker and disconnecting the load 20 from the power system 11. Also, if the voltage falls below some present minimum level, the relay 10 may be tripped.

The relay 10 also includes a communications port 36, such as a RS-485 serial asychronous port, which is connected via line 38 to a master unit 40, such as an energy management computer. The master unit 40 periodically addresses the relay 10 in order to obtain a response therefrom indicating the status of the relay 10. The response constitutes a relay signal. The master unit 40 may be connected to multiple other relays 10. Line 38 is a twisted shielded pair which is used to interface between the relay 10 and the master unit 40. The relay 10 also includes a second communications port 42, such as a RS-232, port which is provided for testing and local programming of the relay 10.

Figure 2:
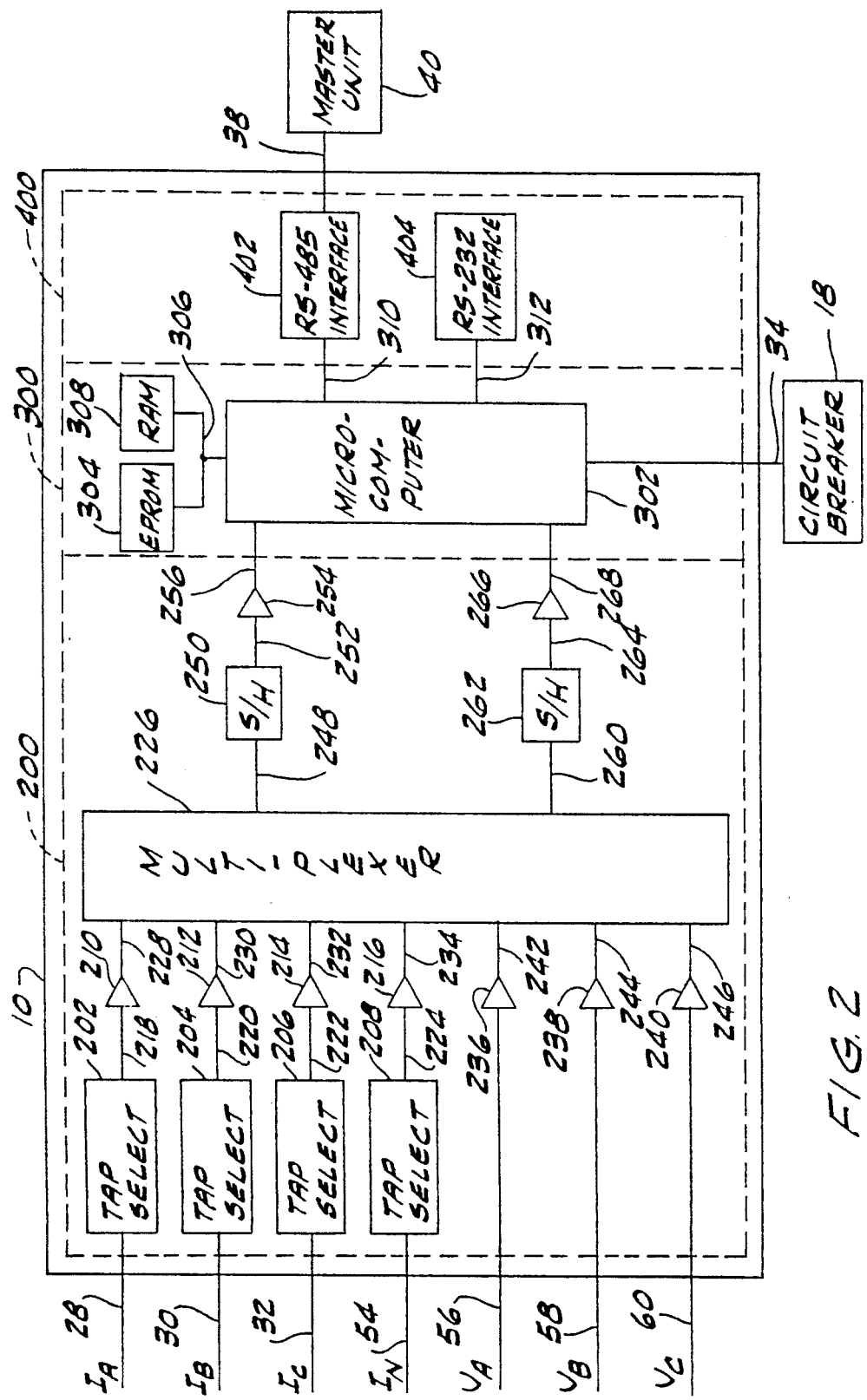
FIG. 2 is a functional block diagram of the overcurrent relay shown in FIG. 1.

FIG. 2 shows a functional block diagram of the overcurrent relay 10 of FIG. 1. The output currents $I_A$, $I_B$, $I_C$, and $I_N$ from the sensing transformers 22, 24, 26, and 44 (FIG. 1) are provided to the overcurrent relay 10 via lines 28, 30, 32, and 54. Additionally, the output voltages $V_A$, $V_B$, and $V_C$ from transformers 48, 50, 52 are provided to the relay 10 via lines 56, 58, and 60. The relay 10 includes an analog board 200, a digital board 300, and a communications board 400. The analog board 200 includes tap selectors 202, 204, 206, and 208 which are connected to lines 28, 30, 32, and 54, respectively. The tap selectors 202, 204, 206, and 208 are provided for scaling the sensed input current signals $I_A$, $I_B$, $I_C$, and $I_N$. The tap selectors 202, 204, 206, and 208 are connected to filters 210, 212, 214 and 216 via lines 216, 218, 220 and 222, respectively. The filters 210, 212, 214 and 216 filter the signals $I_A$, $I_B$, $I_C$, and $I_N$. These filtered signals are supplied to a multiplexer 226 via lines 228, 230, 232, and 234, respectively. The signals $V_A$, $V_B$, and $V_C$ are supplied to filters 236, 238, and 240 via lines 56, 58, and 60, respectively.

The multiplexer 226 provides the filtered signals of $I_A$, $I_B$, $I_C$, and $I_N$ one at a time over a line 248 to a sample and hold circuit 250. The sample and hold circuit 250 provides a signal over a line 252 to a level shifting circuit 254. Level shifting circuit 254 provides the shifted signal over a line 256 to the digital board 300. The multiplexer 226 provides the filtered signals of $V_A$, $V_B$, and $V_C$ one at a time over a line 260 to a sample and hold circuit 262. The sample and hold circuit 262 provides a signal over a line 264 to a level shifting circuit 266. Level shifting circuit 266 provides the shifted signal over a line 268 to the digital board 300.

The digital board 300 includes a microcomputer 302. A program for controlling the operation of the microcomputer 302 is stored in an EPROM (erasable programmable read only memory) 304. At least two harmonics of the currents (or voltages) may be sensed. For example, the program may include an algorithm for converting the samples into an RMS value. Preferably, the algorithm is structured to sum the total currents (or voltages) of the fundamental frequency and a preset number of harmonics thereof. If the total exceeds the set point, the relay is tripped. The sampling rate and up-front anti-alias filtering must be configured to accommodate the harmonic sensing. For example, one preferred algorithm may be:

$$I = k \frac{1}{n} \sum_{1}^{n} V_i^2$$

wherein:
 I = RMS current value;
 k = scale factor including the current transformer ratio, the current transformer burden and the calibration factor;
 $V_i$ = instantaneous voltage value, a composite waveform; and
 n = number of samples.

A data bus 306 connects the EPROM 304 to the microcomputer 302. A RAM (random access memory) 308 is also connected to the data bus 306. The microcomputer 302 is connected to the communications board 400 via lines 310 and 312. Additionally, the microcomputer 302 provides a signal over line 34 to operate the circuit breaker 18.

The communications board 400 includes a RS-485 interface circuit 402 which is connected to the microcomputer 302 via line 310. The interface circuit 402 is connected to the master unit 40 via line 38. The communications board also includes a RS-232 interface circuit 404 which is connected to the microcomputer 302 via line 312.

Figure 3:
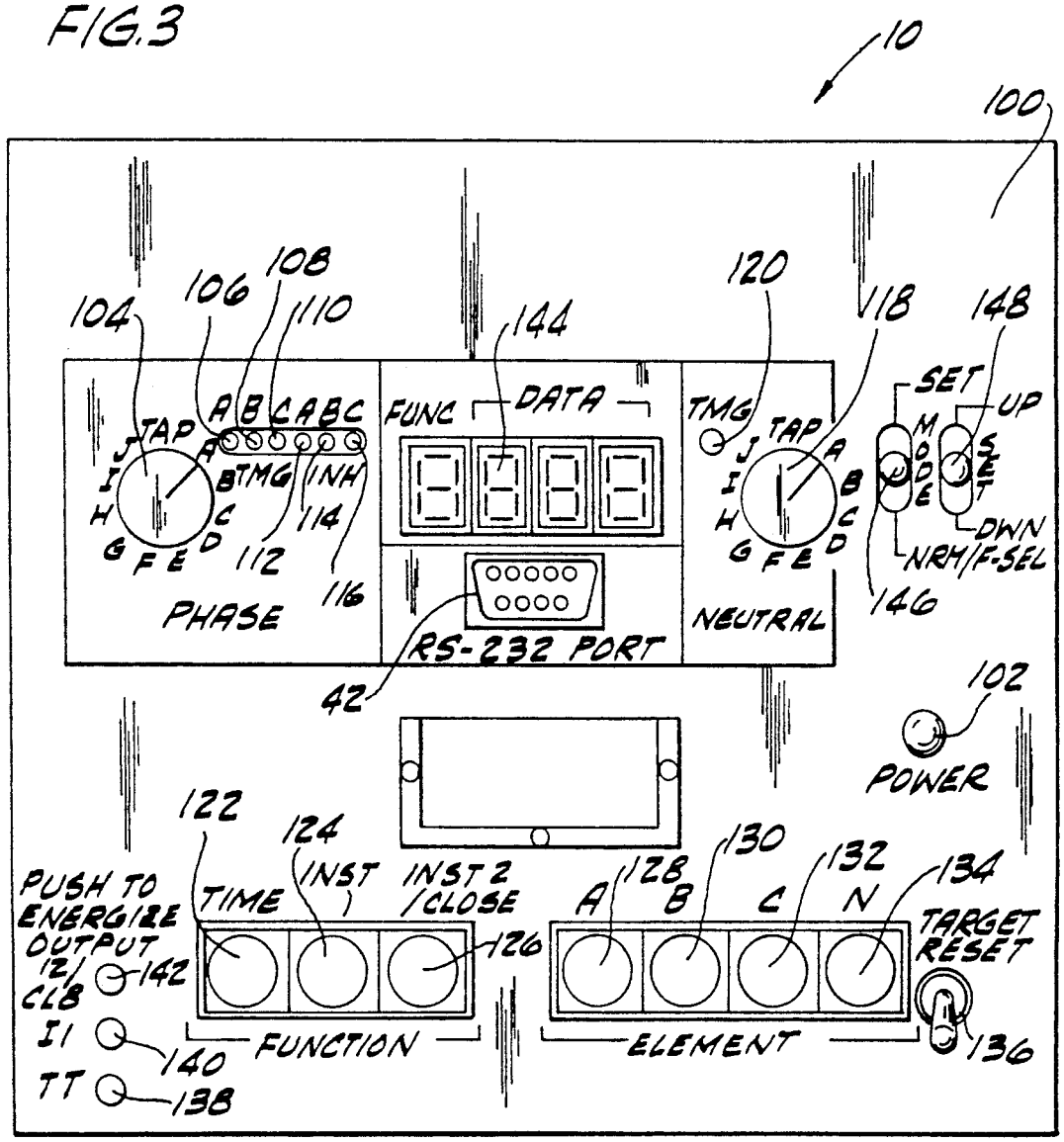
FIG. 3 is a pictorial diagram of controls and a display on a front panel of the overcurrent relay.

In FIG. 3, a front panel 100 including controls and displays of a preferred embodiment of the overcurrent relay 10 is illustrated. A red LED power indicator 102 is illuminated when a power supply (not shown) is providing nominal ±12 VDC to the internal circuitry of the relay 10. A tap selector dial 104 adjustably establishes an overcurrent pickup point for each of the phases being sensed. The dial 104 has a range of ten positions corresponding to ten preset ranges of taps. Three LED timing indicators 106, 108, and 110 are provided to indicate when the overcurrent pickup point for each phase is reached and exceeded. LED 106 is illuminated when phase A has reached and exceeded the overcurrent pickup point and LEDs 108 and 110 are each illuminated when phase B or phase C have reached and exceeded the overcurrent pickup point, respectively. Additionally, three LED voltage inhibit indicators 112, 114, and 116 are provided when each of the phases of the input voltage are being sensed, as shown in FIG. 2. LED 112 lights when the sensed phase A input voltage has exceeded a voltage inhibit level. Also, LEDs 114 and 116 light when either the sensed phase B or C input voltage has exceeded the voltage inhibit level, respectively.

A second tap selector dial 118 adjustably establishes the overcurrent pickup point if the neutral line of the electrical power system is being monitored, as shown in FIG. 2. The tap selector dial 118 has a range of ten positions corresponding to ten present ranges of taps for sealing the sensed input voltage signals. An LED timing indicator 120 is provided to indicate when the neutral overcurrent pickup point has been reached and exceeded.

Magnetically latching, manually reset target indicators 122, 124, and 126 provide visual indication that the respective Timed Trip, Instantaneous 1, and Instantaneous 2/Close trip output relays have been energized. Target indicators 128, 130, 132, and 134 provide visual indication that the respective phase A, phase B, phase C, and Neutral trip output relays have been energized. Each of the indicators 122–134 is manually reset by a target reset lever 136. Each of the output contacts of the relay 10 can be manually actuated by insertion of a thin non-conducting rod as a Push-to-Energize element through respective access holes 138, 140, and 142 in the front panel 100.

The front panel 100 also includes a display 144 for displaying the average three phase current defined as $(I_A + I_B + I_C)/3$. The RS-232 port 42 is accessible through the front panel 100. The RS-485 port 36 is accessible from the back panel (not shown) of the relay 10. The front panel 100 also has a Mode switch 146 and a Set switch 148. The Mode switch 146 allows an operator to select different modes of operation of the relay 10. The Set switch 148 allows the operator to set the relay 10 for different operating conditions.

Figure 4A:
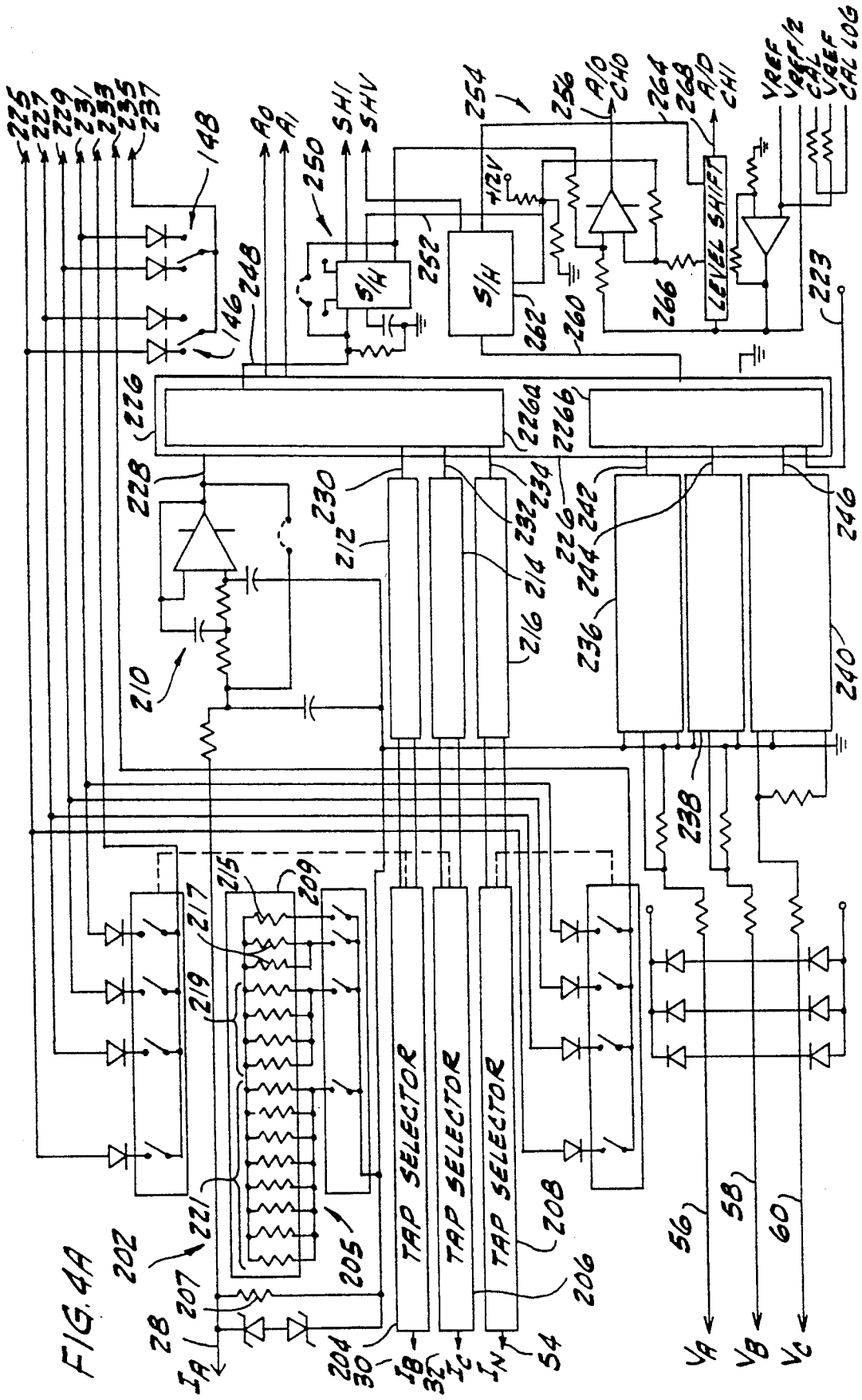
FIGS. 4A and 4B together are a schematic diagram of the analog board shown in FIG. 2.
Figure 4B:
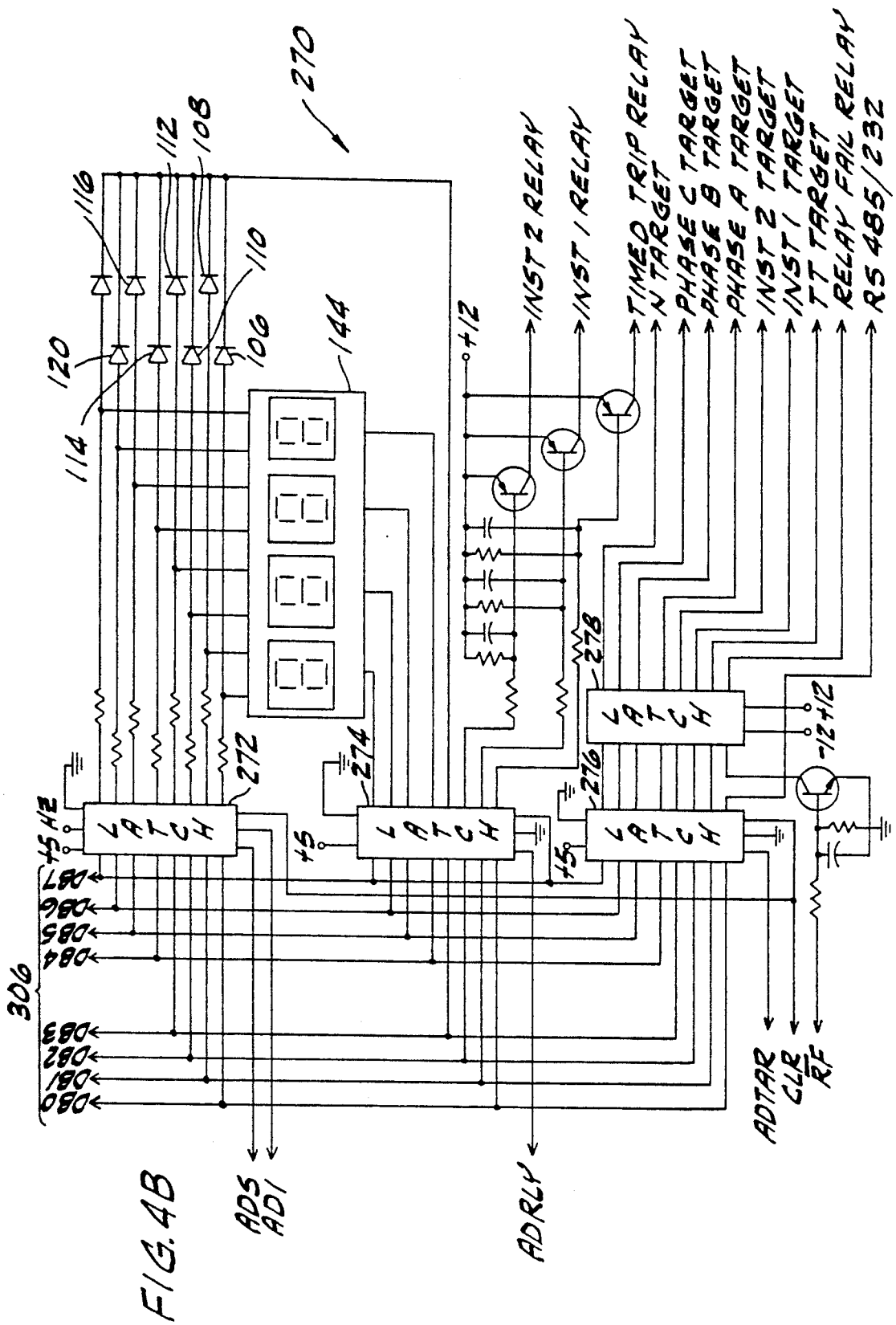

FIGS. 4A and 4B show a detailed schematic drawing of the analog board 200 included in the relay 10. Referring particularly to FIG. 4A, the sensed input currents $I_A$, $I_B$, $I_C$, and $I_N$ are provided to the tap selectors 202, 204, 206, and 208 via liens 28, 30, 32, and 54, respectively. Tap selector 202 comprises a resistor switching network 205 for scaling the sensed input current IA. The resistor switching network 205 comprises a fixed resistor 207 and a binary coded decimal (BCD) switch 209 having variable resistor values connected in parallel with the fixed resistor 207. A pair of zener diodes 211 and 213 are connected in parallel with the fixed resistor 207 to protect the resistor switching network 205. The BCD switch 209 includes a resistor 215 when switched in has a BCD weight of one, a pair of resistors 217 which when switched in have a BCD weight of two, resistors 219 when switched in have a BCD weight of four, and resistors 221 when switched in have a BCD weight of eight. The switch 209 is connected to the dial 204, 206, and 208 are similar in construction to tap selector 202. Tap selectors 202, 204, and 206 are ganged to together and controlled by switch 104 on the front panel 100. Tap selector 208 is controlled by switch 118 on the front panel 100 (see FIG. 3).

The tap selectors 202, 204, 206, and 208 are connected to the filters 210, 212, 214, and 216 via lines 218, 220, 222, and 224. The filters 210, 212, 214, and 216 are low pass filters and provide filtered signals to the multiplexer 226 via lines 228, 230, 232, and 234, respectively. Multiplexer 226 is a dual 1-of-4 multiplexer having a first 1-of-4 multiplexer section 226a and a second 1-of-4 multiplexer section 226b. The signals $V_A$, $B_B$, and $V_C$ are supplied to the second multiplexer section 226b via lines 242, 244, and 246, respectively. A line 223 is connected to the second multiplexer section 226b to provide a signal from either the sample and hold circuits 250 and 262 or a calibration circuit (not shown).

The multiplexer 226 provides two outputs A0 and A1 to the digital board 300. The output from the first multiplexer section 226a is provided to the sample and hold circuit 250 via line 248. The output from the second multiplexer section 226b via line 260. The sample and hold circuits 250 and 262 supply outputs SHI and SHV, respectively, to the digital board 300. The level shifting circuits 254 and 266 provide outputs A/D CH0 and A/D CH1 over lines 256 and 268, respectively, to the digital board 300. Level shifting circuit 266 is similar in construction to level shifting circuit 254.

Lines 225, 227, 229, and 231 are connected to both switches 104 and 118 on the front panel 100. A line 233 is used to indicate that switch 104 is being adjusted and a line 235 is used to indicate that switch 118 is being adjusted. A line 237 is used to indicate that mode switch 146 and set switch 148 are being actuated.

FIG. 4B illustrates a circuit 270 of the analog board 200 which receives signals over the data bus 306 from the digital board 300 for controlling trip output relays (not shown) and targets (not shown). Signals over the data bus 306 are provided to latches 272, 274, 276, and 278. Latches 272 and 274 control the display 144 and latch 272 also controls the LEDs 106–120 on the front panel 100. Latches 276 and 278 supply output signals to control the targets and a relay fail relay (not shown).

Figure 5:
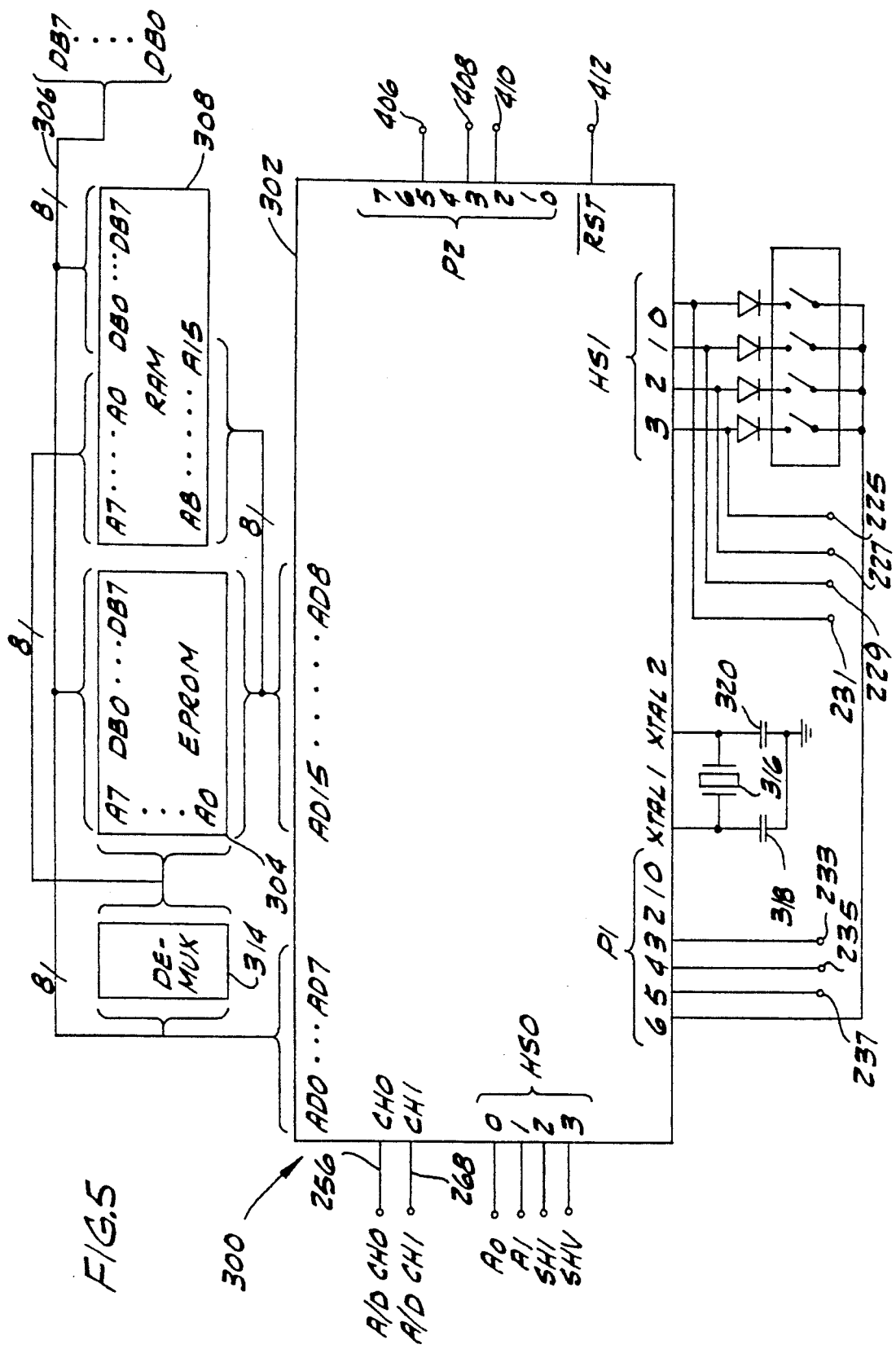
FIG. 5 is a schematic diagram of the digital board shown in FIG. 2.

FIG. 5 illustrates a schematic diagram of the digital board 300 included in the relay 10. The microcomputer 302 is a 80C196 microcomputer which is one of a family of MCS-96 (TM) computers from Intel Corporation, Santa Clara, Calif. Microcomputer 302 addresses RAM 308 at a set of address liens A8–A15. Microcomputer 302 also addresses EPROM 303. A demultiplexer 314 demultiplexes address lines AD0–AD7 and provides these signals to the EPROM 304 and RAM 308. Address lines AD0–AD7 are connected to the circuit 270 shown in FIG. 4B via data bus lines DB0–DB7 of the data bus 306. The microcomputer 302 provides output signals over the data bus 306 for controlling the circuit breaker 18 (see FIG. 1) and other devices such as targets and relays.

Bus notation is employed for further clarity, wherein a numbered slash through a line indicates multiple electrical conductors equal to the number. Chip pins that are unused, held inactive or represent power leads are omitted for clarity in accordance with conventional drawing practice in the art. Microcomputer 302 has a clock crystal 316 connected between input pins XTAL1 and XTAL2. A pair of capacitors 318 and 320 are connected between the crystal 316 and common.

Channels CH0 and CH1 receive signals A/D CH0 and A/D CH1 via lines 256 and 268, respectively, from the analog board 200. A high speed port HS0 receives signals A0, A1, SH1, and SH0 from the analog board 200. A second high speed port HS1 receives signals from the switches 104 and 118 on the front panel 100 via lines 225-231. A port P1 receives signals from the front panel 100 via lines 233-237. A second port P2 receives signals from the communications board 400.

Figure 6:
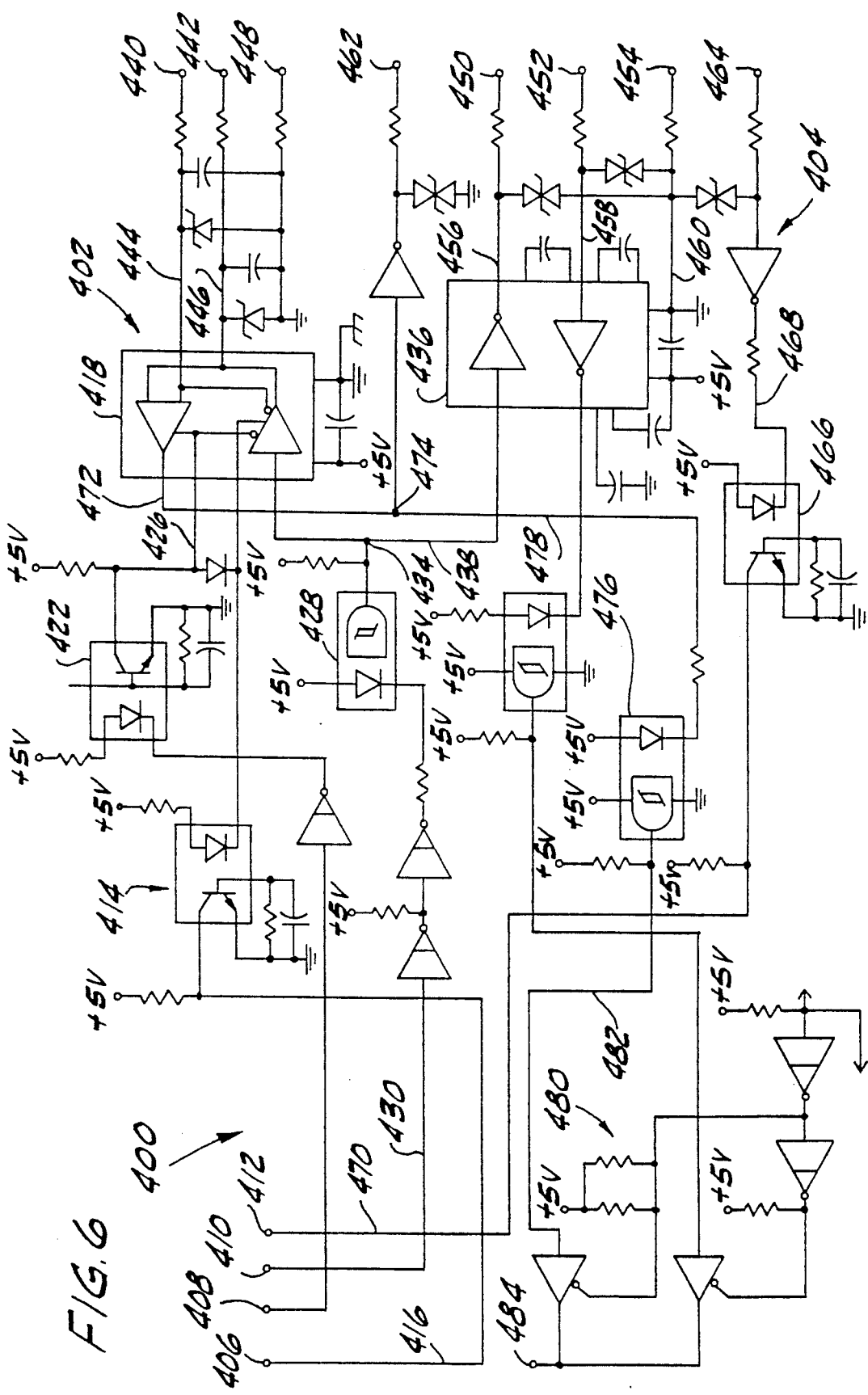
FIG. 6 is a schematic diagram of the communications board shown in FIG. 2.

FIG. 6 shows a schematic diagram of the communications board 400. The communications board 400 includes terminals 406, 408, 410, and 412 for connection to the digital board 300. Terminal 406 is connected to an optoisolator 414 via line 416. Optoisolator 414 is connected to a RS-485 interface circuit 418, such as a DS3696 manufactured by National Semiconductor, via line 420. Terminal 408 is connected to an optoisolator 422 via line 424. Optoisolator 422 is connected to the interface circuit 418 via line 426. Terminal 410 is connected to an optoisolator 428 via line 430. The optoisolator 428 is connected to the RS-485 interface circuit 418 via line 432 at a junction 434. Also, the optoisolator 428 is connected to a RS-232 interface circuit 436, such as a LT10811CJ manufactured by Linear Technology, via line 438.

The RS-485 interface circuit 418 is connected to terminals 440 and 442 via lines 444 and 446, respectively. Terminal 448 is used as a signal ground for the shielded cable 38 which connects the master unit 40 to the RS-485 port 36. Additionally, terminals 440 and 442 connect to the cable 38.

The RS-232 interface circuit 436 is connected to terminals 450, 452, and 454 via lines 456, 458, and 460, respectively. Terminals 450, 452, and 454 are connected to the RS-232 port 42 on the front panel 100. Terminals 462 and 464 are also connected to the RS-232 port 42 on the front panel 100. Terminal 464 is used to select which communications path (RS-232 or RS-485) is to be used. When a positive voltage is present at terminal 464, the relay 10 will communicate over the RS-232 port 42 and keep the RS-485 port 36 in a passive or receive state. When terminal 464 has negative voltage or is unconnected, the relay will communicate over the RS-485 port 36. Terminal 464 is connected to an optoisolator 466 via line 468. The optoisolator 466 is connected to terminal 412 via line 470. Optoisolator 466 is used to detect a connection to the RS-232 port 42. Data transmitted over the RS-485 port 36 will also be transmitted over the RS-232 port 42 via terminal 452. This is due to the connection of the two interface circuits 418 and 436 at junction 434 via lines 432 and 438.

Additionally, terminal 462 is connected to a receive line 472 of the interface circuit 418. Any data received on the RS-485 port 402 will be output to the RS-232 port 404 via line 472 and terminal 462. Line 472 is also connected at a junction 474 to an optoisolator 476 via line 478. The optoisolator 476 is connected to circuitry 480 via line 482 which is connected to the digital board 300 via terminal 484. A signal at terminal 482 indicates that the master unit 40 is communicating with the relay 10. Terminal 484 is connected to pin 1 of port P2 of the microcomputer 302.

In FIG. 7, operations of the microcomputer 302 commence with a start step 700 and proceed to a step 702. In step 702, the microcomputer 302 communicates with the master unit 40 if the transmit signal is present over line 38. If the transmit signal is not present or communication is completed then the program proceeds to a step 702. In step 704 a subroutine Interrupt is run and when completed returns control of the program to a next step 706. The subroutine Interrupt is described in more detail in FIGS. 8A-8C. In step 706 a subroutine RMS Calculations is run to determine the RMS values of the sensed currents and voltages. The subroutine RMS Calculations is described in more detail in FIG. 9. If the RMS values exceed predefined limits for preset periods of time the RMS subroutine will operate the circuit breaker 18. Once the RMS Calculations subroutine is completed the program loops back to step 702.

In FIG. 8A, operations of the microcomputer 302 proceed from a begin step 800 to a step 802. In step 802, the microcomputer 302 retrieves the sensed current signal $I_A$ from the multiplexer 226. The microcomputer 302 then converts the analog signal of $I_A$ to a digital signal. The microcomputer 302 waits for a period of 20 microseconds and then retrieves the sensed current signal $I_B$ from the multiplexer 226. After waiting for a period of 10 microseconds the microcomputer 302 retrieves the $I_A$ digital signal. The microcomputer 302 then begins to convert the analog signal of $I_B$ to a digital signal. Next, the $I_A$ digital signal is processed by first squaring the $I_A$ signal and then adding the squared number to an $I_A$ accumulator. The program continues to a step 804 to decide whether 36 samples of the squared $I_A$ digital signal have been added to the $I_A$ accumulator. If yes, then in a step 806 the value in the $I_A$ accumulator is stored in a temporary memory location. The program then continues to a step 808. If in step 804 it is determined that 36 samples have not been added to the $I_A$ accumulator then the program proceeds to step 808.

In step 808 the microcomputer 302 first waits for a period of 10 microseconds and then retrieves the sensed current signal $I_C$ from the multiplexer 226. The microcomputer 302 waits another 10 microseconds. The microcomputer 302 then retrieves the $I_B$ digital signal. After retrieving the $I_B$ digital signal the microcomputer 302 begins to convert the $I_C$ analog signal to a digital signal. Next, the $I_B$ digital signal is processed by first squaring the $I_B$ signal and then adding the squared number to an $I_B$ accumulator. The program continues to a step 810 to decide whether 36 samples of the squared $I_B$ digital signal have been added to the $I_B$ accumulator. If yes, then in a step 812 the value in the $I_B$ accumulator is stored in a temporary memory location. The program then continues to a step 814. If in step 810 it is determined that 36 samples have not been added to the $I_B$ accumulator then the program proceeds to step 814.

Figure 8B:
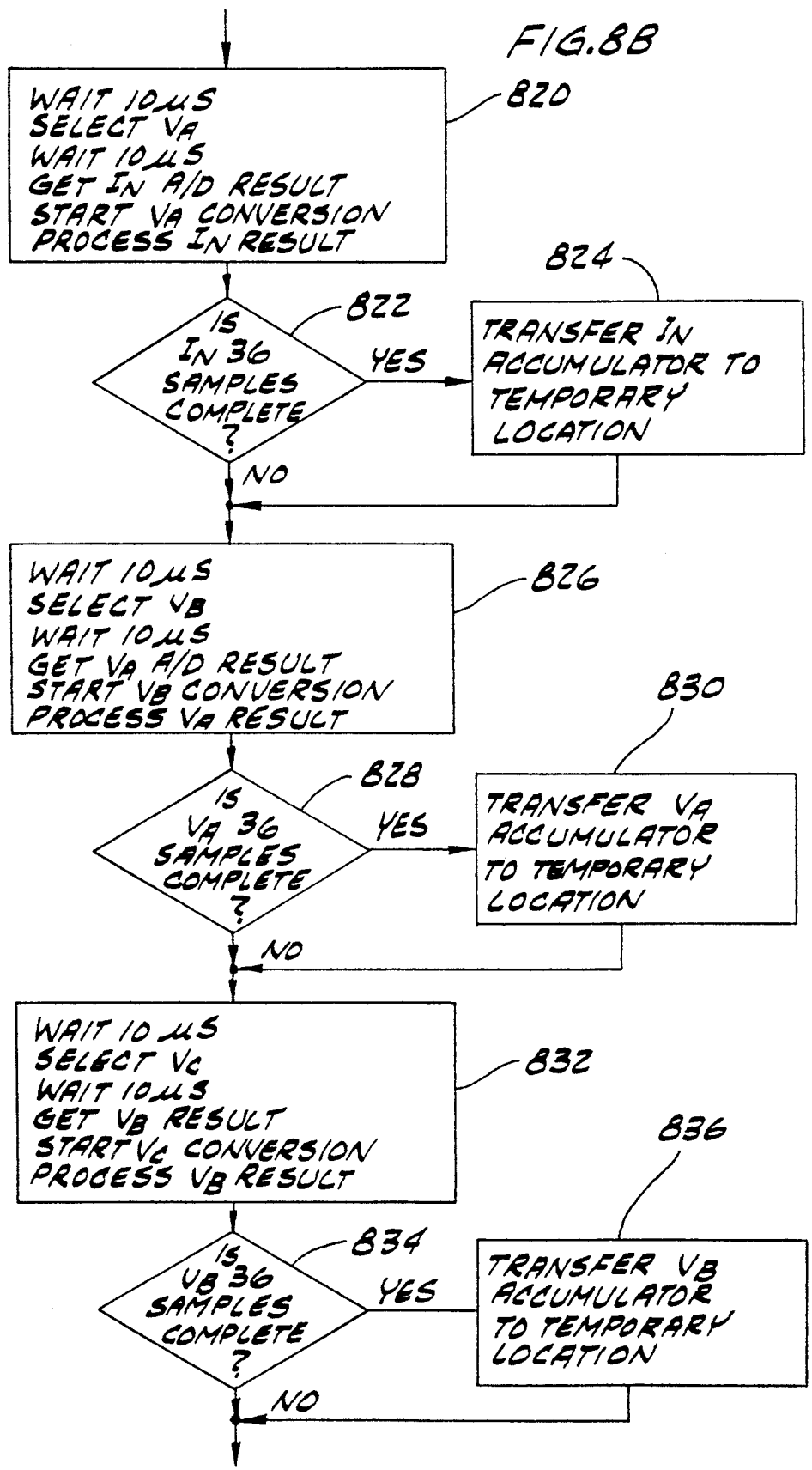

In step 814 the microcomputer 302 first waits for a period of 10 microseconds and then retrieves the sensed current signal $I_N$ from the multiplexer 226. The microcomputer 302 waits another 10 microseconds. The microcomputer 302 then retrieves the $I_C$ digital signal. After retrieving the $I_C$ digital signal the microcomputer 302 begins to convert the $I_N$ analog signal to a digital signal. Next, the $I_C$ digital signal is processed by first squaring the $I_C$ signal and then adding the squared number to an $I_C$ accumulator. The program continues to a step 816 to decide whether 36 samples of the squared $I_C$ digital signal have been added to the $I_C$ accumulator. If yes, then in a step 818 the value in the $I_C$ accumulator is stored in a temporary memory location. The program then continues to a step 820 (FIG. 8B). If in step 818 it is determined that 36 samples have not been added to the $I_C$ accumulator then the program proceeds to step 820.

In step 820 the microcomputer 302 first waits for a period of 10 microseconds and then retrieves the sensed voltage signal $V_A$ from the multiplexer 226. The microcomputer 302 waits another 10 microseconds. The microcomputer 302 then retrieves the digital signal of $I_N$. After retrieving the $I_N$ digital signal the microcomputer 302 beings to convert the $V_A$ analog signal to a digital signal. Next, the $I_N$ digital signal is processed by first squaring the $I_N$ signal and then adding the squared number to an $I_N$ accumulator. The program continues to a step 822 to decide whether 36 samples of the squared $I_N$ digital signal have been added to the $I_N$ accumulator. If yes, then in a step 824 the value in the $I_N$ accumulator is stored in a temporary memory location. The program then continues to a step 826. If in step 822 it is determined that 36 samples have not been added to the $I_N$ accumulator then the program proceeds to step 826.

In step 826 the microcomputer 302 first waits for a period of 10 microseconds and then retrieves the sensed voltage signal $V_B$ from the multiplexer 226. The microcomputer 302 waits another 10 microseconds. The microcomputer 302 then retrieves the digital signal of $V_A$. After retrieving the $V_A$ digital signal the microcomputer 302 begins to convert the $V_B$ analog signal to a digital signal. Next, the $V_A$ digital signal is processed by first squaring the $V_A$ signal and then adding the squared number to a $V_A$ accumulator. The program continues to a step 828 to decide whether 36 samples of the squared $V_A$ digital signal have been added to the $V_A$ accumulator. If yes, then in a step 830 the value in the $V_A$ accumulator is stored in a temporary memory location. The program then continues to a step 832. If instep 828 it is determined that 36 samples have not been added to the $V_A$ accumulator then the program proceeds to step 832.

Figure 8C:
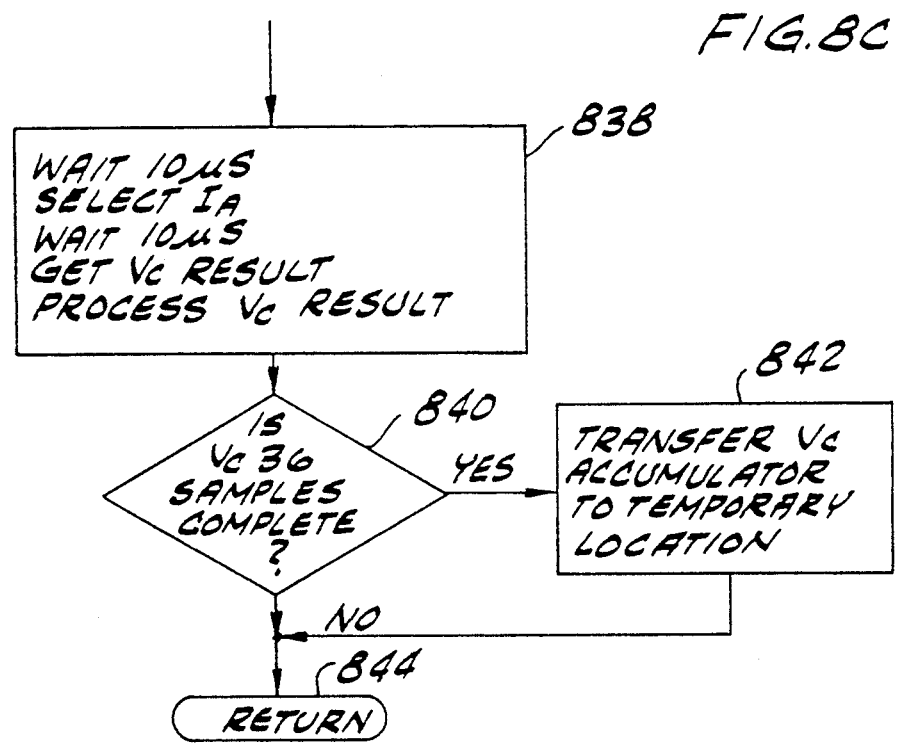

In step 832 the microcomputer 302 first waits for a period of 10 microseconds and then retrieves the sensed voltage signal $V_C$ from the multiplexer 226. The microcomputer 302 waits another 10 microseconds. The microcomputer 302 then retrieves the digital signal of $V_B$. After retrieving the $V_B$ digital signal the microcomputer 302 begins to convert the $V_C$ analog signal to a digital signal. Next, the $V_B$ digital signal is processed by first squaring the $V_B$ signal and then adding the squared number to a $V_B$ accumulator. The program continues to a step 834 to decide whether 36 samples of the squared $V_B$ digital signal have been added to the $V_B$ accumulator. If yes, then in a step 836 the value in the $V_B$ accumulator is stored in a temporary memory location. The program then continues to a step 838 (FIG. 8C). If in step 834 it is determined that 36 samples have not been added to the $V_B$ accumulator then the program proceeds to step 838.

In step 838 the microcomputer 302 first waits for a period of 10 microseconds and then retrieves the sensed current signal $I_A$ from the multiplexer 226. The microcomputer 302 waits another 10 microseconds. The microcomputer 302 then retrieves the digital signal of $V_C$. After retrieving the $V_C$ digital signal the microcomputer 302 begins to convert the $I_A$ analog signal to a digital signal. Next, the $V_C$ digital signal is processed by first squaring the $V_C$ signal and then adding the squared number to a $V_C$ accumulator. The program continues to a step 840 to decide whether 36 samples of the squared $V_C$ digital signal have been added to the $V_C$ accumulator. If yes, then in a step 842 the value in the $V_C$ accumulator is stored in a temporary memory location. The program then continues to a step 844. If in step 840 it is determined that 36 samples have not been added to the $V_C$ accumulator then the program proceeds to step 844. In step 844 control of the program is returned to step 706 of the main loop shown in FIG. 7.

In FIG. 9, operations of the microcomputer 302 proceed from a begin step 900 to a step 902. In step 902 the microcomputer 302 retrieves the value of $I_A$ stored in the temporary location in step 806 of FIG. 8A. The microcomputer 302 then determines the square root of the value of $I_A$. The square root is then multiplied by the scaling factor selected by the tap select switch 104. The program proceeds to a step 904 to determine whether the scaled square root value of $I_A$ exceeds the predetermined value. If it does, then the circuit breaker 18 is operated and in step 906 the control of the program is returned to step 702 of FIG. 7. If not, then control of the program continues to a step 908.

In step 908 the microcomputer 302 retrieves the value of $I_B$ stored in the temporary location in step 812 of FIG. 8A. The microcomputer 302 then determines the square root of the value of $I_B$. The square root is then multiplied by the scaling factor selected by the tap select switch 104. The program proceeds to a step 910 to determine whether the scaled square root value of $I_B$ exceeds the predetermined value. If it does, then the circuit breaker 18 is operated and in step 912 the control of the program is returned to step 702 of FIG. 7. If not, then control of the program continues to a step 914.

In step 914 the microcomputer 302 retrieves the value of $I_C$ stored in the temporary location in step 816 of FIG. 8A. The microcomputer 302 then takes the square root of the value of $I_C$. The square root is then multiplied by the scaling factor selected by the tap select switch 104. The program proceeds to a step 916 to determine whether the scaled square root value of $I_C$ exceeds the predetermined value. If it does, then the circuit breaker 18 is operated and in step 918 the control of the program is returned to step 702 of FIG. 7. If not, then control of the program continues to a step 920.

In step 920 the microcomputer 302 retrieves the value of $I_N$ stored in the temporary location in step 824 of FIG. 8B. The microcomputer 302 then determines the square root of the value of $I_N$. The square root is then multiplied by the scaling factor selected by the tap select switch 104. The program proceeds to a step 922 to determine whether the scaled square root value of $I_N$ exceeds the predetermined value. If it does, then the circuit breaker 18 is operated and in step 924 the control of the program is returned to step 702 of FIG. 7. If not, then control of the program continues to a step 926.

In step 926 the microcomputer 302 retrieves the value of $V_A$ stored in the temporary location in step 830 of FIG. 8B. The microcomputer 302 then determines the square root of the value of $V_A$. The square root is then multiplied by the scaling factor selected by the tap select switch 104. The program proceeds to a step 928 to determine whether the scaled square root value of $V_A$ exceeds the predetermined value. If it does, then the circuit breaker 18 is operated and in step 930 the control of the program is returned to step 702 of FIG. 7. If not, then control of the program continues to a step 932.

In step 932 the microcomputer 302 retrieves the value of $V_B$ stored in the temporary location in step 836 of FIG. 8B. The microcomputer 302 then determines the square root of the value of $V_B$. The square root is then multiplied by the scaling factor selected by the tap select switch 104. The program proceeds to a step 934 to determine whether the scaled square root value of $V_B$ exceeds the predetermined value. If it does, then the circuit breaker 18 is operated and in step 936 the control of the program is returned to step 702 of FIG. 7. If not, then control of the program continues to a step 938.

In step 938 the microcomputer 302 retrieves the value of $V_C$ stored in the temporary location in step 842 of FIG. 8C. The microcomputer 302 then determines the square root of the value of $V_C$. The square root is then multiplied by the scaling factor selected by the tap select switch 104. The program proceeds to a step 940 to determine whether the scaled square root value of $V_C$ exceeds the predetermined value. If it does, then the circuit breaker 18 is operated and in step 942 the control of the program is returned to step 702 of FIG. 7. If not, then control of the program continues to a step 944 which returns the control of the program to step 702 of FIG. 7.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a relay system for protecting an electrical power system supplying electrical power having a current and a voltage of a fundamental frequency to an electrical load, a relay for the system, said relay communicating with a master unit, said relay comprising:
    means for sensing both a current and a voltage of the electrical power of the fundamental frequency and for sensing at least two harmonics of both the current and the voltage of the electrical power and for producing analog signals representative of the sensed current and the sensed voltage;
    means for periodically sampling the analog signals a predetermined number of times during a preset period of time and for converting the analog signals into a series of digital values;
    means for separately processing each of the digital values to determine a processed current value which is a function of the sensed current and the preset period and a processed voltage value which is a function of the sensed voltage and the preset period;
    means, responsive to the processing means, for disconnecting the power system from the load in the event that at least one of the processed current value or the processed voltage value is not within preset limits;
    means for generating a relay signal representative of the processed values; and
    means, responsive to the relay signal, for communicating the processed current and voltage values to the master unit.

2. The relay of claim 1 wherein the electrical power system has a neutral line and wherein the sensing means senses current in the neutral line of the electrical power system.

3. The relay of claim 2 wherein the sensing means senses a current of the electrical power system and wherein the processed current value determined by the processing means corresponds to the period of time that the sensed current is above a preset current limit.

4. The relay of claim 3 further comprising means for storing the processed value in a register and wherein the communicating means comprises means for reading the processed value from the register to communicate the processed value to the remote station.

5. The relay of claim 1 wherein the analog signals are AC signals and wherein the sampling means samples said AC signals, said sensing means further comprising tap selectors for scaling said AC signals.

6. The relay of claim 1 wherein the at least two harmonics is a preset number.

7. The relay of claim 1 further comprising means for storing the processed value in a register and wherein the communicating means comprises means for reading the processed value from the register to communicate the processed value to the remote station.

8. The relay of claim 1 wherein the sensing means senses a current of the electrical power system and wherein the processed value determined by the processing means corresponds to the period of time that the sensed current is above a preset current limit.

9. The relay of claim 8 further comprising means for storing the processed value in a register and wherein the communicating means comprises means for reading the processed value from the register to communicate the processed value to the remote station.

10. In an overcurrent relay system for use in an electrical power system, the electrical power system having a transformer supplying electrical power having a current and a voltage of a fundamental frequency and a load connected through a circuit breaker, a relay for the relay system, said relay communicating with a master unit, said relay comprising:
    means for sensing both a current and a voltage of the electrical power of the fundamental frequency and for sensing at least two harmonics of both the current and the voltage of the transformer and for producing analog signals representative of the sensed current and the sensed voltage;
    means for periodically sampling the analog signals a predetermined number of times during a preset period of time and for converting the analog signals into a series of digital values;
    means for separately processing each of the digital values to determine a processed current value which is a function of the sensed current and the preset period and a processed voltage value which is a function of the sensed voltage and the preset period;
    means, responsive to the processing means, for actuating the circuit breaker to disconnect the transformer from the electrical power system in the event that at least one of the processed current value or the processed voltage value is not within preset limits;
    means for generating a relay signal representative of the processed values; and
    means, responsive to the relay signal, for communicating the processed values to the master unit.

11. The relay of claim 10 wherein the electrical power system has a neutral line and wherein the sensing means senses current in the neutral line of the electrical power system.

12. The relay of claim 11 wherein the processed current value determined by the processing means corresponds to the period of time that the sensed current is above a preset current limit.

13. The relay of claim 12 further comprising means for storing the processed value in a register and wherein the communicating means comprises means for reading the processed value from the register to communicate the processed value to the remote station.

14. The relay of claim 10 wherein the processed value determined by the processing means corresponds to the period of time that the sensed current is above a preset current limit.

15. The relay of claim 14 further comprising means for storing the processed value in a register and wherein the communicating means comprises means for reading the processed value from the register to communicate the processed value to the remote station.

16. The relay of claim 10 further comprising means for storing the processed value in a register and wherein the communicating means comprises means for reading the processed value from the register to communicate the processed value to the remote station.

17. The relay of claim 10 wherein the analog signals are AC signals and wherein the sampling means samples said AC signals, said sensing means further comprising tap selectors for scaling said AC signals.

18. The relay of claim 10 wherein the at least two harmonics is a preset number.

19. In an overcurrent relay system for protecting an electrical power system supplying electrical power having a current of a fundamental frequency to an electrical load, a relay for the system, said relay communicating with a master unit, said relay comprising:

means for sensing the current of the fundamental frequency and for sensing at least two harmonics of the current of the electrical power and for producing analog signals representative of the sensed current;

means for periodically sampling the analog signals a predetermined number of times during a preset period of time and for converting the analog signals into a series of digital values;

means for separately processing each of the digital values to determine a processed current value which is a function of the sensed current and the preset period, the processed current value corresponding to the period of time that the sensed current is above a preset current limit;

means, responsive to the processing means, for disconnecting the power system from the load in the event that the processed current value is not within its preset limit;

means for generating a relay signal representative of the processed value; and means, responsive to the relay signal, for communicating the processed current value to the master unit.

* * * * *